United States Patent
Yamamoto et al.

[19]

[11] Patent Number: 6,097,449
[45] Date of Patent: Aug. 1, 2000

[54] LIQUID-CRYSTAL PROJECTOR HAVING A MIRROR WITH A SPECIFIC TILT ADJUSTMENT MOUNT

[75] Inventors: Chikara Yamamoto, Urawa; Yasuyuki Miyata, Yuki; Takashi Watanabe, Omiya, all of Japan

[73] Assignee: Fuji Photo Optical Co., Ltd., Omiya, Japan

[21] Appl. No.: 09/146,352

[22] Filed: Sep. 3, 1998

[30] Foreign Application Priority Data

Sep. 26, 1997 [JP] Japan ................................. 9-279992

[51] Int. Cl.[7] ......................... G02F 1/1335; G03B 21/00; G03B 21/28
[52] U.S. Cl. ..................... 349/5; 349/8; 353/69; 353/98
[58] Field of Search ............... 349/5, 8; 353/69, 353/98, 99

[56] References Cited

U.S. PATENT DOCUMENTS

| | | | |
|---|---|---|---|
| 4,735,500 | 4/1988 | Grunwald | 353/61 |
| 5,743,611 | 4/1998 | Yamaguchi et al. | 349/5 |
| 5,836,664 | 11/1998 | Conner et al. | 353/70 |
| 5,903,388 | 5/1999 | Sedlmayr | 349/8 |

FOREIGN PATENT DOCUMENTS 6-18833   1/1994   Japan ......................... 349/8

*Primary Examiner*—Walter Malinowski
*Attorney, Agent, or Firm*—Arnold International; Bruce Y. Arnold

[57] ABSTRACT

A light projector is disclosed that enables a bright display image to be presented with minimum waste of useable light. By arranging at least one light directing means, such as a mirror or a reflecting prism, on an optical path between a light source and a light modulator, and by supporting the light directing means using a support that enables the orientation of the light directing means to be rotatably adjusted, the position of a light spot which illuminates the modulator is made to be adjustable in position, thereby enabling the intensity of the light spot on the modulator to be maximized while minimizing vignetting of the light spot by the modulator.

9 Claims, 9 Drawing Sheets

LIQUID-CRYSTAL PROJECTOR HAVING A MIRROR WITH A SPECIFIC TILT ADJUSTMENT MOUNT

BACKGROUND OF THE INVENTION

Techniques are conventionally known in liquid-crystal illumination systems which apply a light integrator so as to reduce illumination unevenness. Also, due to the recent strong demand for higher resolution displays, many liquid-crystal panels now have more picture elements to satisfy this demand, which has also resulted in projection lenses often requiring more lens elements in order to reduce aberrations to an acceptable level while projecting images formed on liquid crystal panels having higher resolution displays. As a result of these trends toward higher resolution, there has been an accompanying tendency for vignetting of liquid-crystal panels to increase and the transmission factor of projection lenses to decrease, thereby lowering the illumination at a viewing screen.

Therefore, in order to maintain a bright display image in higher resolution displays, there is greater need to accurately match the location of an illuminating light beam to the location of the liquid-crystal panel, thereby obtaining a maximum illumination at the viewing screen.

However, any attempt to more accurately match the location of an illuminating light beam with that of a liquid-crystal panel in order to generate a brighter display generates a need to adjust for deviations in the positioning of the illuminating light beam as a result of production tolerances and errors that occur, for example, in the positioning of the filament of a light source to its base and in the positioning and alignment of other optical components used to produce the light beam which illuminates the liquid crystal panel.

One known method of adjusting for such deviations between a liquid-crystal panel and an illuminating light beam includes shifting, in a plane normal to the optical axis, the position of a lens which transmits polychromatic light from a light source before separating the polychromatic light into three colors. However, in this method, the amount of shifting of the lens relative to the adjustment of the illuminating light beam is roughly one to one, and thus the amount of shifting required so as to adjust the location of the illumination becomes large, which thereby enlarges the size of the illumination system as a whole. Further, a mechanism with sufficient driving power to shift the lens a large amount is also required, resulting in higher cost.

Another method for maintaining sufficient brightness at the viewing screen is to increase the intensity of the illuminating light source. However, this requires that additional measures be taken to deal with the additional heat generated from a higher intensity light source and, therefore, this approach is considered impractical.

In the illumination optics of an endoscope, it is known to shift a light source together with a reflector, or to shift a converging lens, so as to prevent a decline in illumination caused by deviations of an illuminating light beam. However, the illumination optics of a liquid-crystal projector are larger, as a whole, than the illumination optics of an endoscope. Thus, it is considered impractical to adopt such techniques for use with a liquid-crystal projector.

BRIEF SUMMARY OF THE INVENTION

The present invention relates to an optical system utilizing a light integrator and is designed in consideration of production tolerances and errors of the light integrator itself as well as those of any light sources and other optical components arranged along an optical path. The purpose of the invention is to enable an illuminating light beam that is incident onto a liquid-crystal panel to be easily adjusted in two dimensions so as to compensate for such production tolerances and/or errors. More specifically, the present invention relates to a color, liquid-crystal projector which directs luminous flux from a light source to the color-separating optics of a liquid crystal projector using one or more mirrors or equivalent structure. The invention enables the position of each chromatic component illuminating beam to be readily adjusted in two dimensions relative to an associated liquid crystal modulator.

In considering the optical path of rays projected onto each liquid-crystal panel of a three-color projector through an integrator, the ray height (Y) in a given dimension is given by the following equation (1), where f is the focal distance of a projection lens and θ is the exit angle of the rays from the integrator in that dimension;

$$Y = f \tan(\theta) \qquad (1)$$

In the present invention, at least one tiltable mirror or equivalent structure is arranged along the optical path so as to adjust the illuminating beam position on each liquid-crystal panel. Thus, when a mirror is tilted by an angle of α degrees, the ray height Y on the associated liquid-crystal panel is expressed as in equation (2);

$$Y = f \tan(\theta + 2\alpha) \qquad (2)$$

As is apparent from equation (2), the amount of shift in height of a ray (ΔY) for a given shift in mirror angle (Δα) is increased by a factor 2f, with f being greater than unity. Thus, using a single mirror (or equivalent structure), to adjust the illumination beam incident on a given liquid crystal panel enables the illumination of the liquid crystal projector to be efficiently adjusted using a compact device.

A first object of the invention is to enable the illumination beam that illuminates a liquid-crystal modulator of a projector to be easily and efficiently adjusted using a compact device so as to achieve a bright monochrome display.

A second object of the invention is to provide a three-color, liquid-crystal projector, with each of the color-separated beams able to be easily adjusted in position using a compact device so as to achieve a bright color display.

BRIEF DESCRIPTION OF DRAWINGS

The present invention will become more fully understood from the detailed description given below and the accompanying drawings, which are given by way of illustration only and thus are not limitative of the present invention, and wherein.

DETAILED DESCRIPTION

The liquid-crystal projector of the present invention includes: a light source for emitting polychromatic light; a light integrator so as to make the amount of light emitted from the light source substantially uniform (i.e., even) in a cross section that is normal to an optical axis; a light collector including at least one condenser lens for collecting light output from the light integrator; a chromatic light separator so as to separate light received from the collector into three chromatic components; a liquid-crystal panel for modulating each respective chromatic component in response to predetermined information; a chromatic light synthesizer for composing the modulated chromatic components; and, a projecting lens for projecting light composed by the chromatic light synthesizer. The invention is characterized by there further being provided at least one light directing means (which may comprise, for example, a mirror or equivalent structure such as a reflecting prism) that is arranged along the optical path and which is supported by a tilt adjustment mechanism that can rotatably adjust the light directing means about one or two axes that are normal to the optical path. This enables the light directed by the light directing means so as to be incident on a liquid crystal panel to be adjusted in one or two dimensions relative to the liquid-crystal panel.

The chromatic light separator includes: a first dichroic mirror for separating out a first chromatic component of light emitted from the light source; a second dichroic mirror for separating out a second chromatic component and a third chromatic component of light received from the first dichroic mirror; a light directing means for directing a separated chromatic component of light to a respective liquid crystal panel; and, a tilt adjustment mechanism for supporting the light directing means and for adjusting a light beam directed by the light directing means angularly about one or two axes, to thereby make a separated chromatic component adjustable in one or two dimensions relative to an illuminated liquid-crystal panel.

Specific embodiments of the invention will be explained below with reference to the figures.

Embodiment 1

Figure 1:
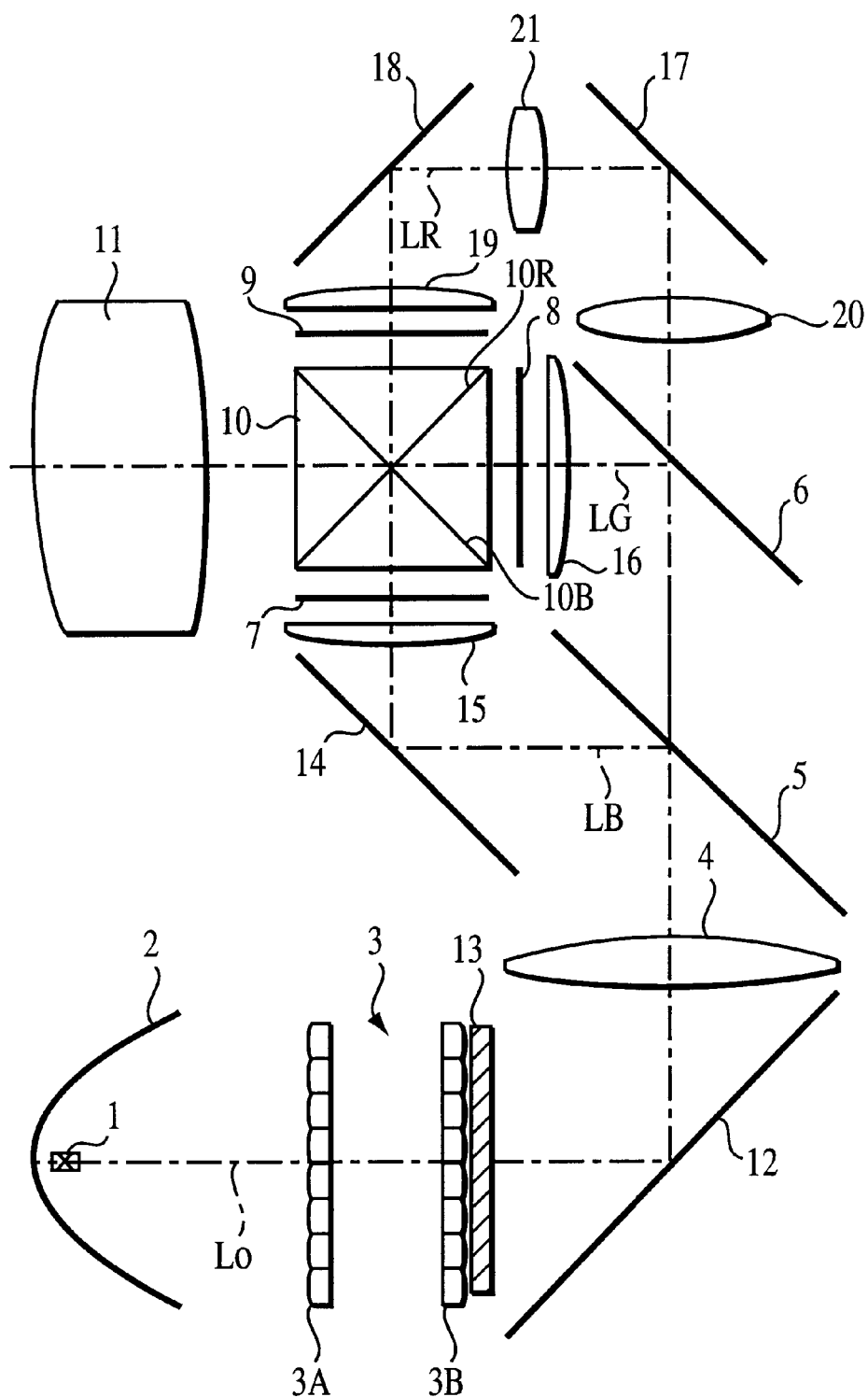
FIG. 1 is a figure showing the structure of a liquid-crystal projector of a first embodiment of the invention.

FIG. 1 illustrates the structure of a liquid-crystal projector according to a first embodiment of the invention. As illustrated in FIG. 1, the liquid-crystal projector of the first embodiment includes: a light source 1 that emits polychromatic light; a reflector 2, which may, for example, be composed of a parabolic mirror and is used for reflecting the polychromatic light emitted from the light source 1 and forming a light beam; a light integrator 3 for making the amount of light in the beam from the light source 1 substantially uniform in a cross section normal to the optical axis; a condenser lens 4 for gathering rays emitted from the light integrator 3; a first dichroic mirror 5 and a second dichroic mirror 6 for separating polychromatic light into three chromatic components; a first liquid-crystal panel 7, a second liquid-crystal panel 8 and a third liquid-crystal panel 9 for modulating each chromatic component in response to predetermined data; a tricolor synthetic prism 10 for composing each chromatic component of light modulated by each liquid-crystal panel 7, 8 and 9; and a projection lens 11 for forming images of the rays composed at the tricolor synthetic prism 10 onto a screen. A total reflection mirror 12 is arranged on the optical path between the light integrator 3 and the condenser lens 4 for reflecting rays emitted from the light integrator 3 and thereby directing them to the condenser lens 4.

The reflector 2 (which may, for example, be composed of a dichroic mirror) has a focal position at the location of the light source 1, thereby reflecting a portion of polychromatic light that is emitted from the light source 1 in the leftward direction of the figure and making it travel roughly parallel to the optical axis Lo in the direction of light integrator 3. The light integrator 3 includes a first lenticular lens array 3A for forming multiple beams from the light source 1 and a second lenticular lens array 3B for superimposing each luminous flux from the first lenticular lens array 3A onto each liquid-crystal panel 7, 8 and 9. Also, to the right of the second lenticular lens array 3B and along the optical axis, a polarizing beam splitter (hereinafter PBS) 13 is positioned so as to separate collimated luminous flux that was made even at the light integrator 3 into a P polarization component and an S polarization component and to then combine both polarizations into one polarized beam.

Various arrangements are possible for separating color chromatic components of light at the first dichroic mirror 5 and the second dichroic mirror 6 by alternating the incidence direction of the luminous flux and the arrangement of the mirrors. However, in this embodiment, the chromatic components of light are separated in the following manner. The first dichroic mirror 5 separates incident rays that were made substantially uniform at the light integrator 3 and polarized at the PBS 13 into a blue component LB, and a remainder component (which contains both a green component LG and a red component LR). The second dichroic mirror 6 separates this remainder component into a green component LG and a red component LR.

Each chromatic component of light is then projected at a respective liquid-crystal panel 7, 8 or 9, which receives data so as to modulate the light component in accordance with the corresponding chromatic image component of a display image. As shown in FIG. 1, along the optical path of the blue component LB there are positioned a first mirror 14, for totally reflecting the blue component LB, and a field lens 15 (which receives the light and forms it into collimated (i.e., parallel) rays and projects these rays onto a first liquid-crystal panel 7, where the blue component of the display image is modulated in accordance with input data. A field lens 16 is located along the optical path of the green component LG so as to form this component into collimated rays and project it onto a second liquid-crystal panel 8 where the green component of the display image is modulated in accordance with input data. Furthermore, along the optical path of the red component LR, there are positioned a second mirror 17 and a third mirror 18, each for totally reflecting the red component LR onto a third liquid-crystal panel 9 where modulation of the red component of the display image occurs. Field lenses 19 and 20 are for forming the red component light into collimated rays before this light is modulated.

In the projection optics mentioned above, only the red component LR has a different distance from the source 1 to the tricolor synthetic prism 10. However, a relay lens 21 is arranged between the second mirror 17 and the third mirror 18 so as to make the source 1 of the red component LR appear equally distant as that of the blue and green component light. The tricolor synthetic prism 10 is a crossed prism, which includes a dichroic surface 10B for reflecting the blue component LB and a dichroic surface 10R for reflecting the red component LR, while transmitting the green component LG.

A tilt adjustment mechanism may be provided for adjusting the orientation of each of the total reflection mirror 12, first mirror 14, second mirror 17 and third mirror 18 so as to tilt each mirror 12, 14, 17 and 18 in one or two dimensions relative to a surface that is normal to the optical axis, so that the illumination projected onto each liquid-crystal panel 7, 8 and 9 is adjustable in two dimensions.

Figure 2A:
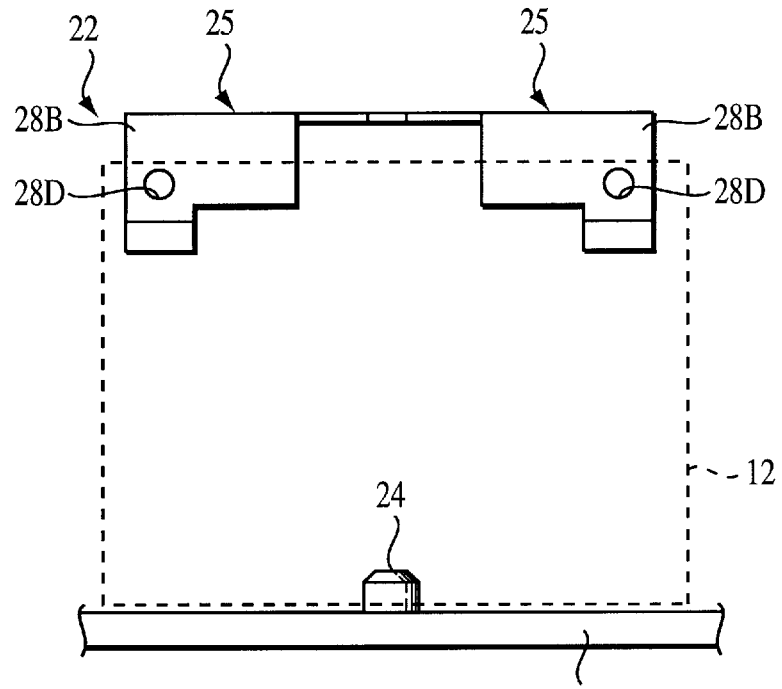
FIG. 2(a) is a front view showing the structure of a first example of a tilt adjustment mechanism which may be used to support and adjust the orientation of various mirrors used in the invention.
Figure 2B:
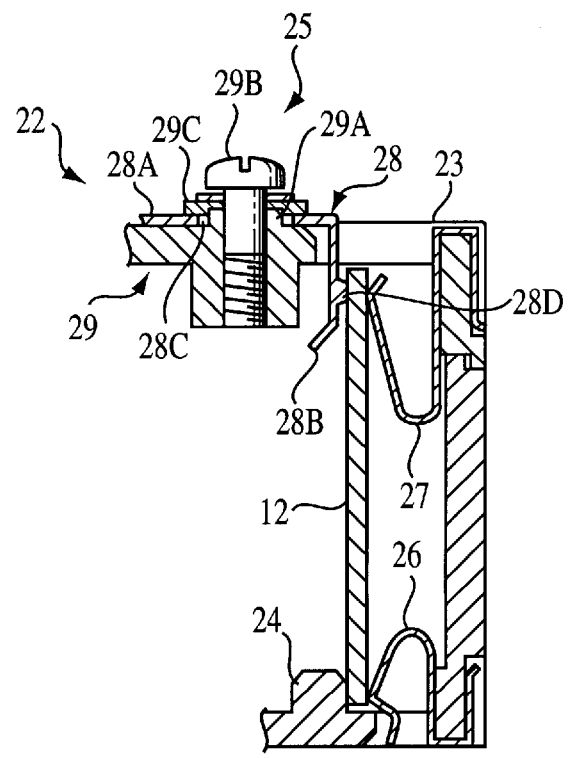
FIG. 2(b) is a vertical cross-sectional view of the tilt adjustment mechanism illustrated in FIG. 2(a)

FIGS. 2(a) and 2(b) illustrate the structure of a first example 22 of a tilt adjustment mechanism, with FIG. 2(a) being a front view; and FIG. 2(b) being a vertical cross-sectional view.

In FIGS. 2(a) and 2(b), total reflection mirror 12 is used as an example of a mirror which can be adjusted in orientation using the tilt adjustment mechanism 22. However, the mirrors 14, 17 and 18 may similarly be supported so that their orientation can likewise be controlled via a respective tilt adjustment mechanism.

As shown in FIGS. 2(a) and (b), the tilt adjustment mechanism 22 of the first example has the total reflection mirror 12 positioned on a mirror supporting frame 23. The mirror supporting frame supports a bottom edge of the mirror 12, and includes: a bottom supporting member 24 for supporting one surface of the mirror near its bottom edge at the center thereof; a pair of left and right top supporting members 25 for supporting the left and right, top edge of the total reflection mirror 12; and, springs 26 and 27 for pushing against the opposite surface of the total reflection mirror 12 so as to hold the total reflection mirror securely against each supporting member 24 and 25.

The bottom supporting member 24 is a cylindrical member protruding from the bottom of the mirror supporting frame 23 upwards, and is in contact with one surface of the total reflection mirror 12 near its periphery, thus supporting the mirror along the bottom edge near the center of the bottom edge of total reflection mirror 12. The surface immediately opposite bottom supporting member 24 of total reflection mirror 12 is in contact with one edge of a spring 26, whose other edge is fixed to the supporting frame 23. Thus, total reflection mirror 12 is pushed against the bottom supporting member 24 by this spring 26.

Each top supporting member 25 includes an adjustment plate 28 (FIG. 2(a)) which contacts one side of the total reflection mirror 12 and supports it near its top edge, and a fixing member 29 for fixing the adjustment plate 28 to the mirror supporting frame 23. The adjustment plate 28 is made of a plate having an L-shaped cross section, and includes a slide piece 28A that is mobile along the top of the supporting frame 23 in a direction parallel to the optical axis, and an adjoining piece 28B which extends from the slide piece 28A downward and contacts one side of the total reflection mirror 12. The slide piece 28A has an adjustment hole 28C for fitting therein a fixing member 29, and the adjoining piece 28B has a semi-spherical protruding section 28D which protrudes toward a side of the total reflection mirror 12.

On the other hand, the fixing member 29 has a screw fixing section 29A protruding toward a top surface of the supporting frame 23, and a screw 29B screwed into a threaded hole in screw fixing section 29A. Since screw fixing section 29A is fitted into the adjustment hole 28C of the adjustment plate 28, the adjustment plate 28 can be shifted toward or away from the optical axis relative to the total reflection mirror 12. The opposite side of total reflection mirror 12 adjoining each top supporting member 25 is in contact with an edge of the spring 27 whose other edge is fixed to the supporting frame 23, and the total reflection mirror 12 is pushed against each top supporting member 25 by this spring 27.

The top supporting member 25 can be assembled onto the mirror supporting frame 23 by fitting the screw fixing section 29A of the fixing member 29 into the adjustment hole 28C of the adjustment plate 28, adjoining the protruding section 28D to one side of the total reflection mirror 12, and screwing the screw 29B into the screw fixing section 29A through a washer 29C between the slide piece 28A and the head of the screw 29B.

The tilt of the total reflection mirror 12 is adjusted with the tilt adjustment mechanism 22 by loosening the screw of the left and right top supporting member 25, shifting each individual adjustment plate 28 forward or backward relative to the total reflection mirror 12 within the range of adjustment hole 28C, tightening the screw 29B in the screw fixing section 29A when the total reflection mirror 12 is tilted at a proper inclination, and fixing the adjustment plate 28 to the supporting frame 23.

By adjusting the tilt of the total reflection mirror 12 as described above, the location of the illuminating spot of the chromatic component beams which were separated at the first dichroic mirror 5 and the second dichroic mirror 6 and projected onto respective liquid-crystal panels 7, 8 and 9 can be shifted. Thus, each liquid-crystal panel 7, 8 and 9 can be illuminated efficiently. The orientation of each of the first to third mirrors 14, 17 and 18 can be individually adjusted angularly in two dimensions, thus individually shifting the locations of the light spots of each chromatic component of light projected on each liquid-crystal panel, 7, 8 and 9, and efficiently illuminating each liquid-crystal panel 7, 8 and 9 even in the case where there are different deviations in each chromatic component path which must be compensated for.

Figure 3A:
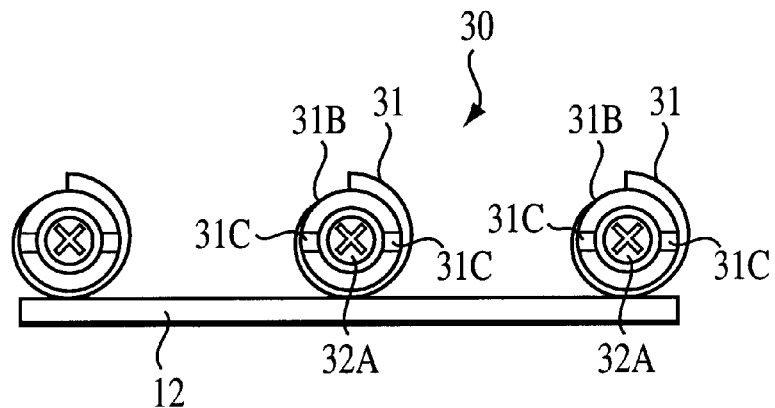
FIG. 3(a) is a plan view showing the structure of a tilt adjustment mechanism according to a second example.
Figure 3B:
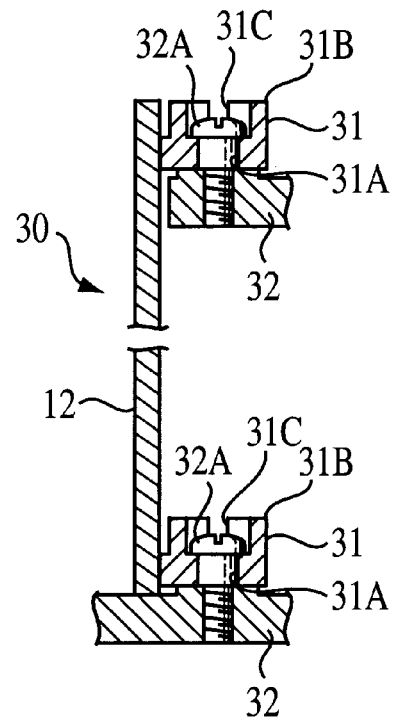
FIG. 3(b) is a vertical cross-sectional view of the tilt adjustment mechanism shown in FIG. 3(a)

In the liquid-crystal projector of this embodiment, it is also possible to apply, instead of the tilt adjustment mechanism 22 of the first example, a tilt adjustment mechanism with different structure. For example, FIGS. 3(a) and 3(b) illustrate the structure of a second example 30 of tilt adjustment mechanism, with FIG. 3(a) being a plan view and FIG. 3(b) being a vertical cross-sectional view. The tilt adjustment mechanism 30 of this example includes a spiral washer 31 and a washer fixing section 32 (FIG. 3(b)) for fixing the spiral washer 31 to the supporting frame 23 (FIG. 2(a)). The spiral washer 31 has an outer circumference with a gradually widening diameter, and has a hole 31A so as to allow a screw 32A to be inserted therein. On the top of the spiral washer 31, a cylindrical section 31B is formed so as to hide the head of the screw 32A in the hole 31A, and the top side wall sections of the cylindrical sections 31B have a pair of concave parts 31C opposite one another in a radial direction.

On the other hand, the washer fixing section 32 is located on the supporting frame 23 and can support the screw 32A for fixing the outer circumference of each spiral washer 31 against the front surface of a mirror, such as total reflection mirror 12. There are a total of three washer fixing sections 32, located as follows: at the bottom edge of the mirror near the center thereof and the top edge of the mirror near the left and right sides thereof. Even though not shown in the figures, springs are provided so as to press against the back side of the mirror and thereby hold it snugly against each spiral washer 31.

The tilt of the mirror may be adjusted using the tilt adjustment mechanism 30 of the second example by loosening the screw 32A for fixing each spiral washer 31 to the washer fixing section 32, rotating each spiral washer 31, and then tightening the screw 32A in each washer fixing section 32 when the mirror is properly inclined, thereby fixing each spiral washer 31 to the supporting frame 23.

Figure 4A:
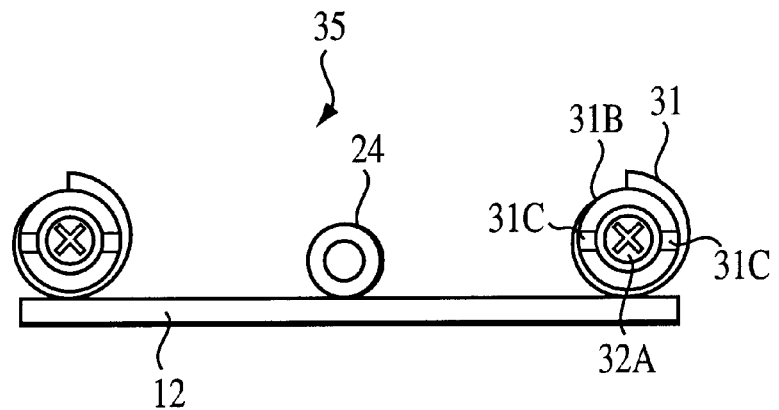
FIG. 4(a) is a plan view showing the structure of a tilt adjustment mechanism according to a third example.
Figure 4B:
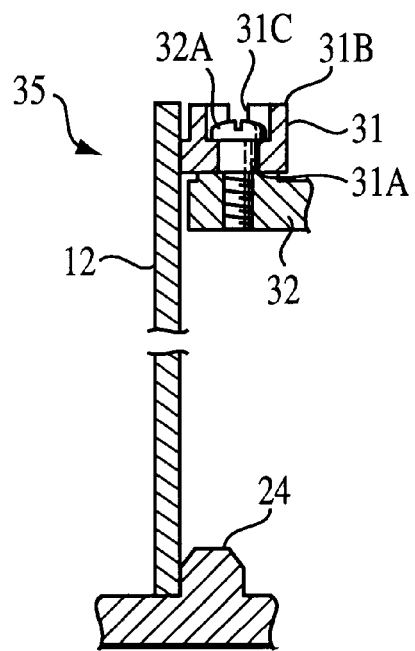
FIG. 4(b) is a vertical cross-sectional view of the tilt adjustment mechanism shown in FIG. 4(a)

FIGS. 4(a) and 4(b) illustrate the structure of a third example 35 of a tilt adjustment mechanism. FIG. 4(a) is a plan view; and FIG. 4(b) is a vertical cross-sectional view. The tilt adjustment mechanism 35 of the third example can also provide the same function as the tilt adjustment mechanism 22 of the first example shown in the FIG. 2, whereby each mirror 12, 14, 17 and 18 may be tilted in one or two dimensions relative to a surface which is normal to the incident light to thereby individually adjust the positions of light spots which illuminate liquid-crystal panels 7, 8 and 9, and thus allow each liquid-crystal panel 7, 8 and 9 to be efficiently illuminated. Moreover, since the tilt of each mirror 12, 14, 17 and 18 is adjusted by the spiral washer 31, the tilt of each mirror 12, 14, 17 and 18 can be minutely adjusted.

A tool 33 for rotating the spiral washer 31 in the tilt adjustment mechanism 30 of the second example is explained by referring to FIG. 5.

Figure 5A:
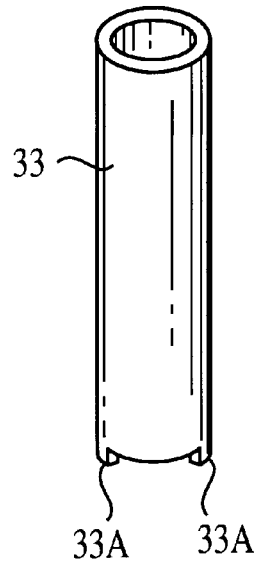
FIG. 5(a) is a perspective view of a tool for rotating a spiral washer.
Figure 5B:
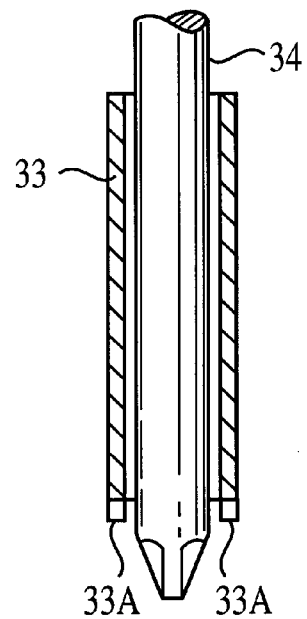
FIG. 5(b) is a vertical cross-sectional view of the tool shown in FIG. 5(a)

FIGS. 5(a) and 5(b) show the tool 33, with FIG. 5(a) being a partial perspective view and FIG. 5(b) being a vertical cross-sectional view. As illustrated in FIGS. 5(a) and (b), the tool 33 for rotating the spiral washer 31 has a cylindrical shape in which the shaft of a driver 34 can pass through, and has a pair of convex parts 33A that face each other in a radial direction and are located at a bottom edge side wall so as to join a pair of concave parts 31C (FIG. 3(a) or FIG. 4(a)) of the spiral washer 31.

In order to rotate the spiral washer 31 by the tool 33, the convex piece 33A of the tool 33 is first joined to the concave part 31C of the spiral washer, and the edge of the driver 34 is joined to the head of screw 32A by passing the shaft of the driver 34 through the tool 33. The tool 33 is fixed in this condition; and after loosening the screw 32A by rotating the driver 34, the spiral washer 31 is rotated by rotating the tool 33 so as to incline the total reflection mirror 12 at a predetermined tilt. When the total reflection mirror 12 is inclined at a preferable tilt, the tool 33 is fixed and the screw 32A is tightened by rotating the driver 34, thus fixing the spiral washer 31.

With the application of this tool 33, the spiral washer 31 can be rotated to the proper azimuth to correct the position of illuminating spot on a liquid-crystal panel, and thus the tilt of the total reflection mirror 12 can be easily adjusted.

The tilt adjustment mechanism 35 of the third example shown in FIGS. 4(a) and 4(b) is different from the tilt adjustment mechanism 30 of the second example in that the same cylindrical member as the bottom supporting member 24 of the tilt adjustment mechanism 22 of the first example is applied as a member for supporting the bottom of total reflection mirror 12, but other functions are the same as the tilt adjustment mechanism 30 of the second example. Thus, the same reference numerals are used for identical parts in the tilt mechanisms 30 and 35 as in the first example, and detailed explanation is omitted.

In the tilt adjustment mechanism 35 of the third example, the tilt of the total reflection mirror 12 can be adjusted by rotating the spiral washer 31. The tool 33 for rotating the spiral washer 31 can be the same as the one used for the tilt adjustment mechanism 30 of the second example.

The tilt mechanism 35 of the third example, shown in FIGS. 4(a) and 4(b) has the same operational effect as the tilt adjustment mechanism 22 of the first example shown in FIG. 3: each mirror 12, 14, 17 and 18 is tilted with respect to a surface that is normal to the incident light so as to make the projection locations of the light spots of beams reflected on each mirror 12, 14, 17 and 18 moveable relative to each corresponding liquid-crystal panel 7, 8 and 9, thus efficiently illuminating each liquid-crystal panel 7, 8 and 9.

The structure of the liquid-crystal projector is not limited to the above-noted first embodiment, and can be ones shown in, for example, FIGS. 6–9 with the alternating of structures from a light source to a color separating section. In each liquid-crystal projector, a selected tilt adjustment mechanism 22, 30 or 35 may be provided to a particular mirror so as to provide adjustment to the total reflection mirror 12 and the first to the third mirrors 14, 17 and 18.

In the following embodiments, members having the same function as the liquid-crystal projector of the first embodiment have identical reference numerals, and a detailed explanation thereof is omitted. As in the liquid-crystal projector according to the first embodiment, in the liquid-crystal projector according to the second to the fifth embodiments, the tilt of each mirror 12, 14, 17 and 18 can be adjusted by using a selected one tilt adjustment mechanism 22, 30 or 35, thereby eliminating deviations of an illumination spot relative to each liquid-crystal panel 7, 8 and 9. Of course, the same selected tilt adjustment mechanism 22, 30 or 35 need not be used for each mirror that is to be made adjustable in orientation so as to enable a compact and bright display to be achieved.

Embodiment 2

Figure 6:
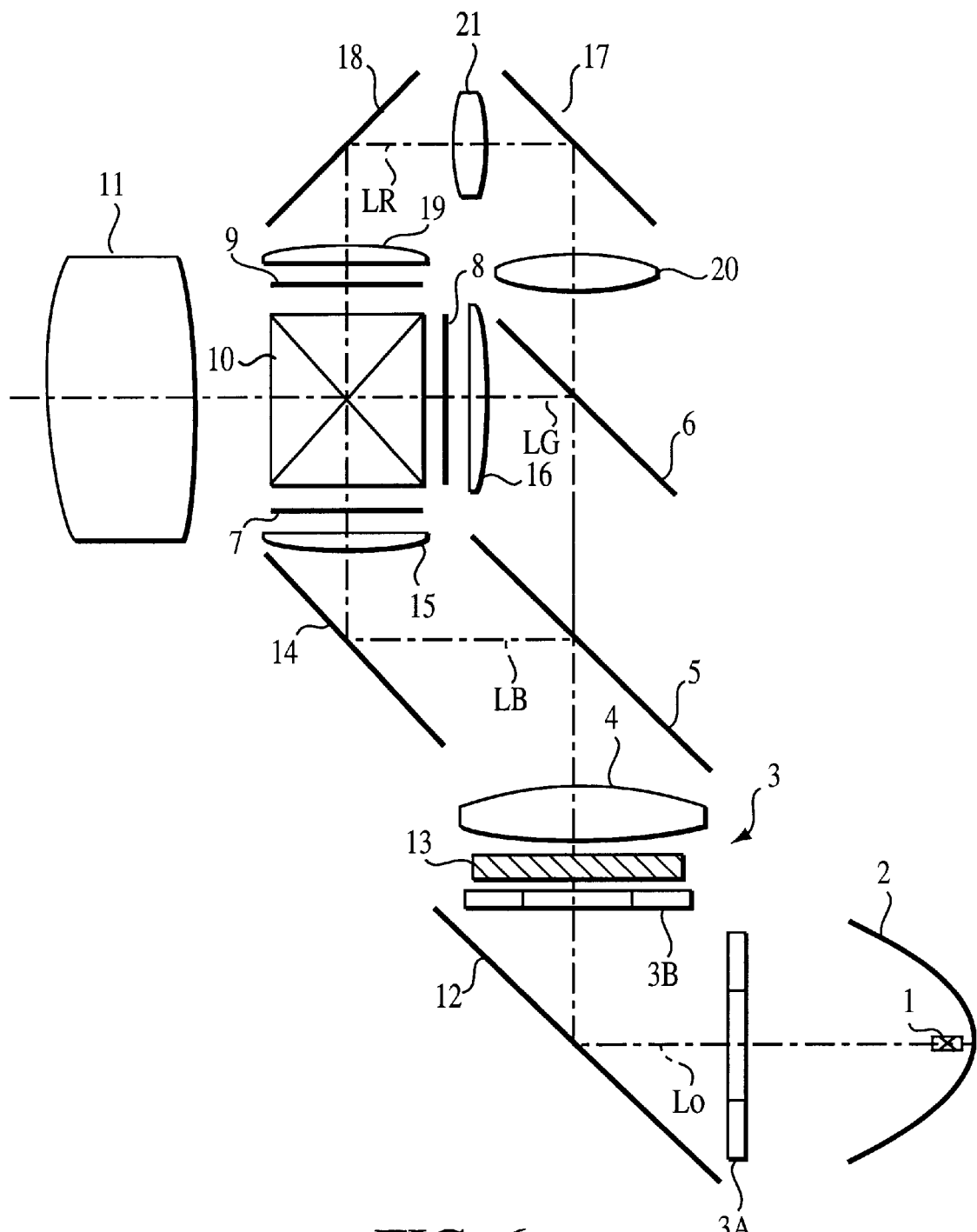
FIG. 6 is a view showing the structure of a liquid-crystal projector according to a second embodiment of the invention.

FIG. 6 illustrates the structure of a liquid-crystal projector according to a second embodiment of the invention. As shown in FIG. 6, the liquid-crystal projector of the second embodiment is different from the liquid-crystal projector of the first embodiment in that the total reflection mirror 12 is arranged on an optical path between a first lenticular lens array 3A and a second lenticular lens array 3B. Other structural characteristics of this embodiment are roughly the same as the liquid-crystal projector of the first embodiment.

Embodiment 3

Figure 7:
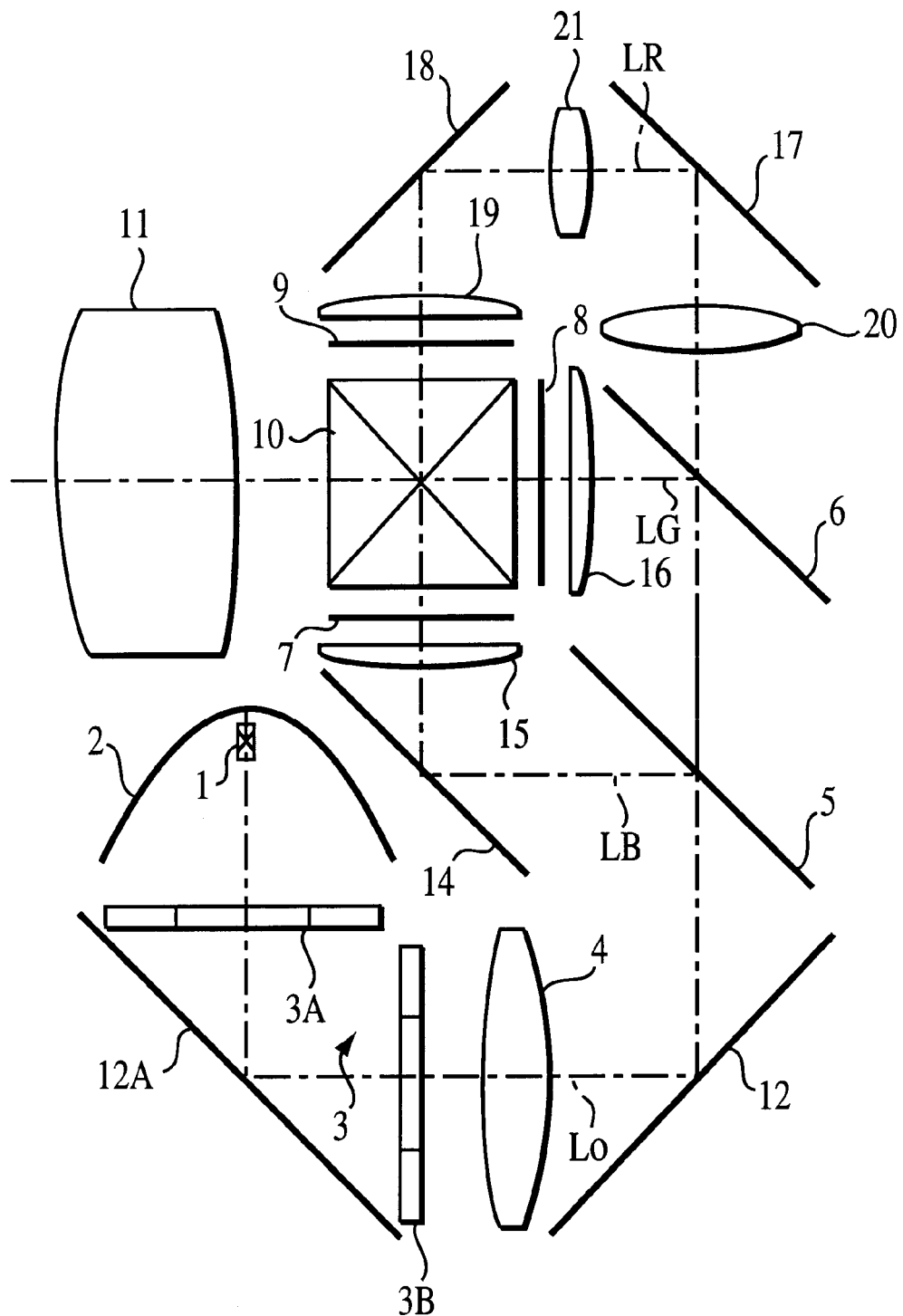
FIG. 7 is a view showing the structure of a liquid-crystal projector according to a third embodiment of the invention.

FIG. 7 illustrates the structure of the liquid-crystal projector of a third embodiment of the invention. The liquid-crystal projector of this embodiment differs from that of the first embodiment in that the condenser lens 4 is placed in front of the total reflection mirror 12, a total reflection mirror 12A is additionally provided on an optical path between the first lenticular lens array 3A and the second lenticular lens array 3B, and the PBS 13 is omitted. Other structural characteristics of this embodiment are roughly the same as the liquid-crystal projector of the first embodiment.

Embodiment 4

Figure 8:
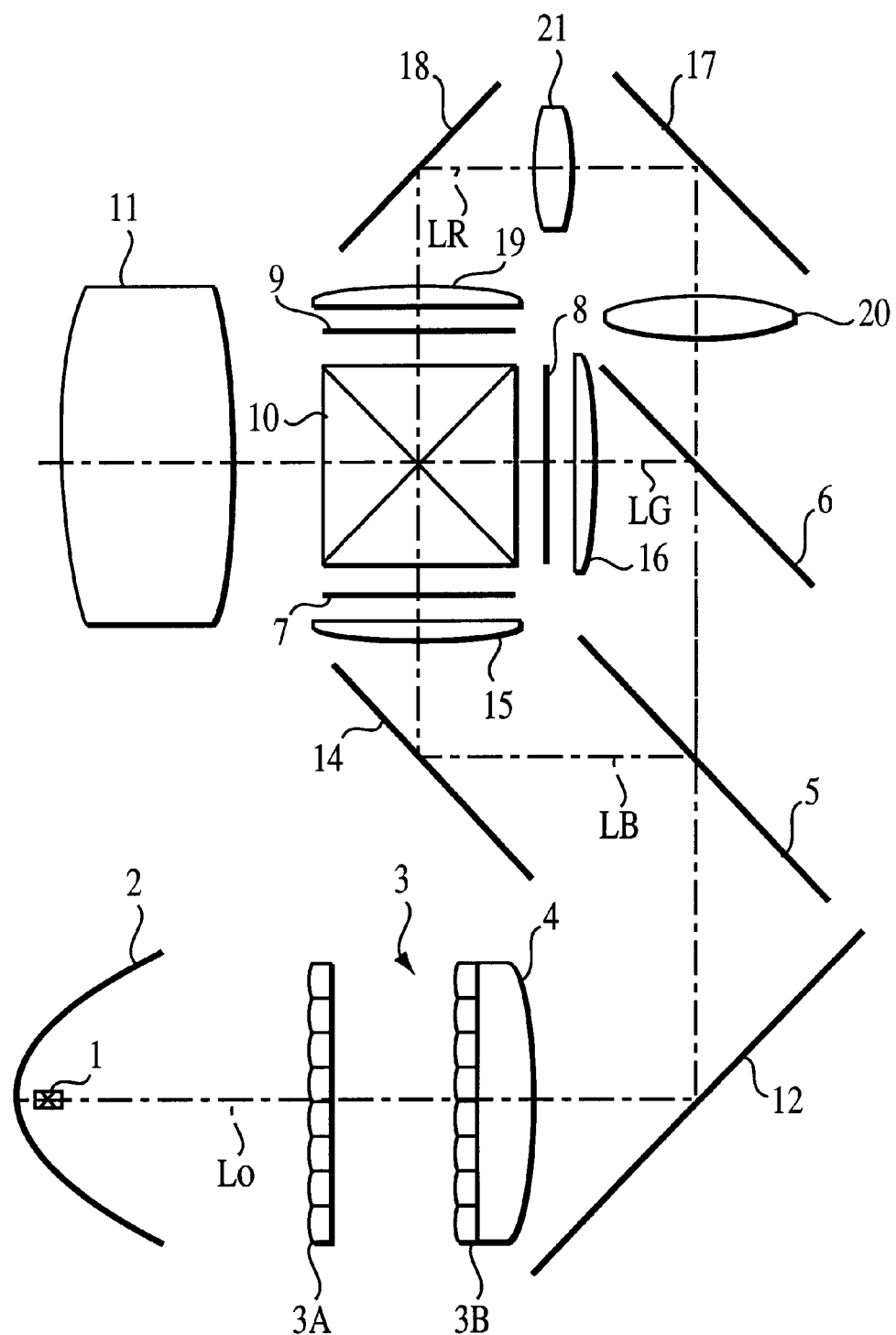
FIG. 8 is a view showing the structure of a liquid-crystal projector according to a fourth embodiment of the invention.

FIG. 8 illustrates the structure of the liquid-crystal projector according to a fourth embodiment of the invention. This embodiment differs from the liquid-crystal projector of the first embodiment in that the condenser lens 4 is placed in front of the total reflection mirror 12, the condenser lens 4 is arranged in one body with the second lenticular lens array 3B, and the PBS 13 is omitted. Other structural characteristics of this embodiment are roughly the same as in the first embodiment.

Embodiment 5

Figure 9:
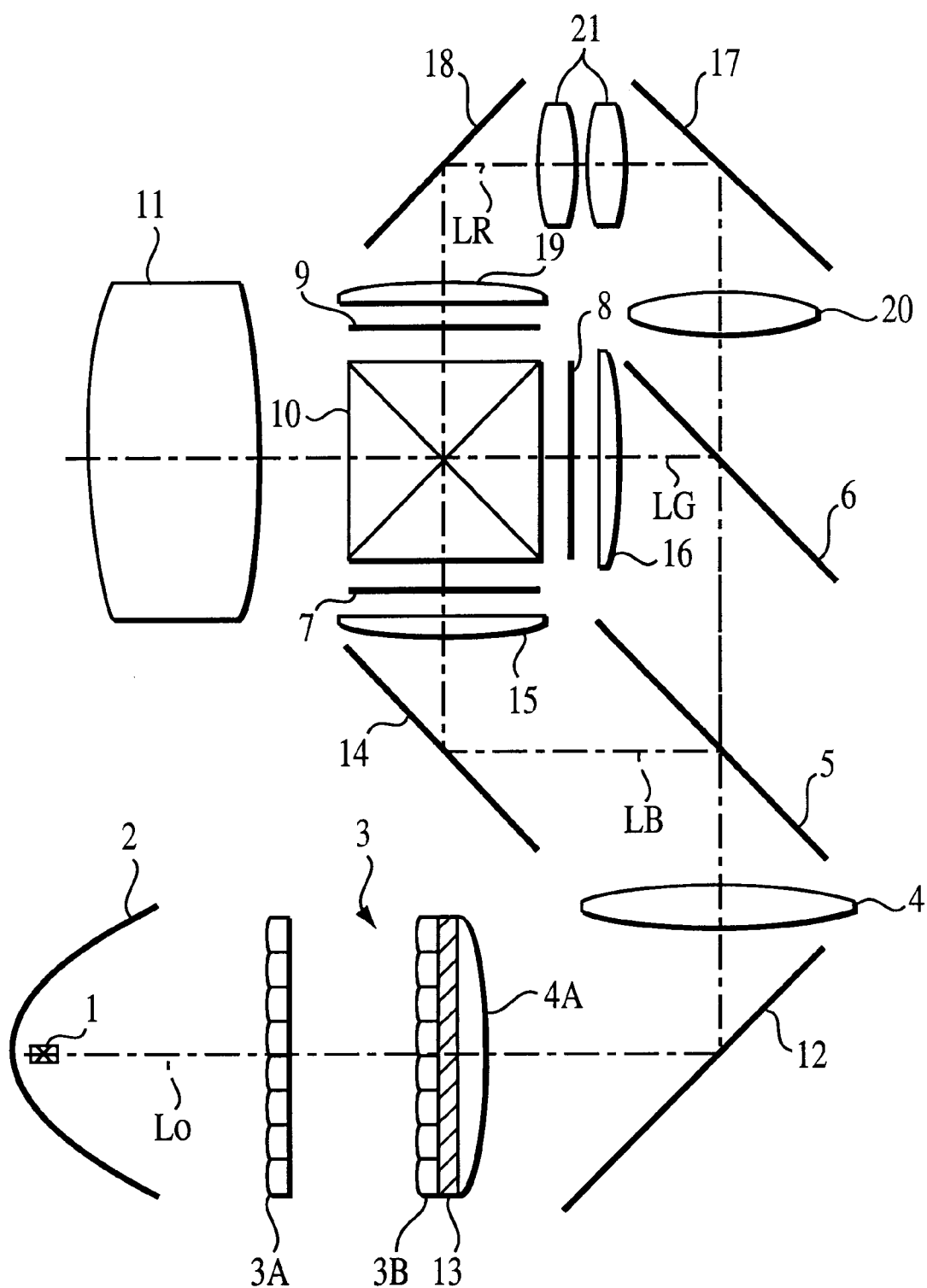
FIG. 9 is a view showing the structure of a liquid-crystal projector according to a fifth embodiment of the invention.

FIG. 9 illustrates the structure of a liquid-crystal projector according to a fifth embodiment of the invention. This embodiment differs from the liquid-crystal projector of the first embodiment in that the PBS 13 and a condenser lens 4A are arranged sequentially in one body on a back side of the second lenticular lens array 3B, and in that two relay lenses 21 and 21 are placed along the optical path between the second mirror 17 and the third mirror 18. Other structural characteristics of this embodiment are roughly the same as the liquid-crystal projector of the first embodiment.

In adjusting the tilt of each mirror 12, 14, 17 and 18 in each tilt adjustment mechanism 22 (30, 35), an operator may visually judge projected images on a screen and manually adjust the tilt of each mirror 12, 14, 17 and 18; or a mechanism may be applied where the tilt of each mirror 12, 14, 17 and 18 is automatically adjusted by feedback from a detecting mechanism.

As described above, the liquid-crystal projector of the present invention provides ready adjustment of the tilt of mirrors in order to adjust the illumination range using a tilt adjustment mechanism which can eliminate deviations of an illumination spot relative to each liquid-crystal panel that modulates a chromatic component of a display. This enables each liquid-crystal panel to be efficiently illuminated without loss of light due to vignetting. Thus, a compact, bright and power-saving liquid-crystal projector may be achieved.

The invention being thus described, it will be obvious that the same may be varied in many ways. For example, although one of the tilt adjustment mechanisms 22, 30 and 35 are provided to the four mirrors 12, 14, 17 and 18 in the above embodiments, a tilt adjustment mechanism may be provided only to the mirror 12 in the case where deviations of an illumination spot on each liquid-crystal panel 7, 8 and 9 can be ignored. Or, the tilt mechanism on one of the two mirrors 17 and 18 may be eliminated.

Or, the invention could be used to project black and white, rather than color images onto a display screen. Such variations are not to be regarded as a departure from the spirit and scope of the invention. Moreover, the scope of the present invention is not intended to be limited to that given in the above specific examples. Rather, the scope is intended to be defined by the following claims and their legal equivalents.

What is claimed is:

1. A color liquid-crystal projector comprising:
   a light source for emitting polychromatic light;
   a light integrator for making the polychromatic light substantially uniform in a cross section that is normal to an optical axis;
   a light collector including at least one condenser lens for collecting the polychromatic light from the light integrator;
   a chromatic light separator for separating polychromatic light transmitted through the collector into three chromatic components of light;
   a light modulator for modulating each respective chromatic component of light that is separated at the chromatic light separator, in response to predetermined data;
   a chromatic light synthesizer for composing into a single light beam each of the chromatic components; and
   a projection lens for projecting the light beam composed at the chromatic light synthesizer;
   wherein at least a first light directing means is provided, said first light directing means including a tilt adjustment mechanism that allows the orientation of the light directing means to be adjusted, to thereby enable the position of an illuminating light spot on the modulator to be adjusted,
   said first light directing means including a frame for a mirror, said frame including a bottom supporting member and a top supporting member, said top supporting member including a pair of adjustable left and right supports for supporting the left and right, top edge of a mirror, said bottom supporting member including a member that supports a surface of the mirror near the bottom edge of the mirror at a position between said pair of left and right supports, and springs for pushing against the opposite surface of a mirror so as to hold the top of the mirror securely against the left and right adjustable supports and to hold the bottom of the mirror securely against said member.

2. The color liquid-crystal projector of claim 1, wherein the left and right adjustable supports are each independently adjustable in directions that are parallel to the optical axis, to thereby cause a light beam that is reflected by said mirror to be tilted left or right, and/or up or down, relative to the optical axis, depending on which one or ones of the left and right adjustable supports are moved and the direction of motion.

3. The color liquid-crystal projector of claim 2, wherein at least one of the left and right adjustable supports includes a spiral-shape member that is rotatable to thereby enable the support position of the adjustable support to be adjusted.

4. The color liquid-crystal projector of claim 1, wherein said member that supports a surface of the mirror near the bottom edge of the mirror at a position between said pair of left and right supports is cylindrical in shape where it contacts the mirror.

5. The color liquid-crystal projector of claim 1, said first light directing means including a frame for a mirror, said frame including a bottom supporting member and a top supporting member, said top supporting member including a pair of adjustable left and right supports for supporting the left and right, top edge of a mirror, said bottom supporting member including a member that supports a surface of the mirror near the bottom edge of the mirror at a position between said pair of left and right supports, and springs for pushing against the opposite surface of a mirror so as to hold the top of the mirror securely against the left and right adjustable supports and to hold the bottom of the mirror securely against said member.

6. The color liquid-crystal projector of claim 5, wherein the left and right adjustable supports are each independently adjustable in directions that are parallel to the optical axis, to thereby cause a light beam that is reflected by said mirror to be tilted left or right, and/or up or down, relative to the optical axis, depending on which one or ones of the left and right adjustable supports are moved and the direction of motion.

7. The color liquid-crystal projector of claim 6, wherein at least one of the left and right adjustable supports includes a spiral-shape member that is rotatable to thereby enable the support position of the adjustable support to be adjusted.

8. The color liquid-crystal projector of claim 5, wherein said member that supports a surface of the mirror near the bottom edge of the mirror at a position between said pair of left and right supports is cylindrical in shape where it contacts the mirror.

9. A color liquid-crystal projector comprising:
   a light source for emitting polychromatic light;
   a light integrator for making the polychromatic light substantially uniform in a cross section that is normal to an optical axis;

a light collector including at least one condenser lens for collecting the polychromatic light from the light integrator;

a chromatic light separator for separating polychromatic light transmitted through the collector into three chromatic components of light;

a light modulator for modulating each respective chromatic component of light that is separated at the chromatic light separator, in response to predetermined data;

a chromatic light synthesizer for composing into a single light beam each of the chromatic components; and a projection lens for projecting the light beam composed at the chromatic light synthesizer;

wherein at least a first light directing means is provided, said first light directing means including a tilt adjustment mechanism that allows the orientation of the light directing means to be adjusted, to thereby enable the position of an illuminating light spot on the modulator to be adjusted, said first light directing means including a frame for a mirror, said frame including two supporting members for supporting a first surface of the mirror near opposite edges thereof, one of said supporting members including a pair of spaced-apart, adjustable supports for supporting the mirror near a first edge, the other supporting member including a single support member that supports the first surface of the mirror near a second edge of the mirror at a position between said spaced-apart supports, said first edge of the mirror and said second edge of the mirror being opposite edges of the mirror, and springs for pushing against a second surface of the mirror that is opposite said first surface so as to hold the mirror securely against the spaced-apart adjustable supports and said single support member.

\* \* \* \* \*